April 12, 1932.  A. J. FRAME  1,853,345
OIL BURNING APPARATUS
Filed July 17, 1931
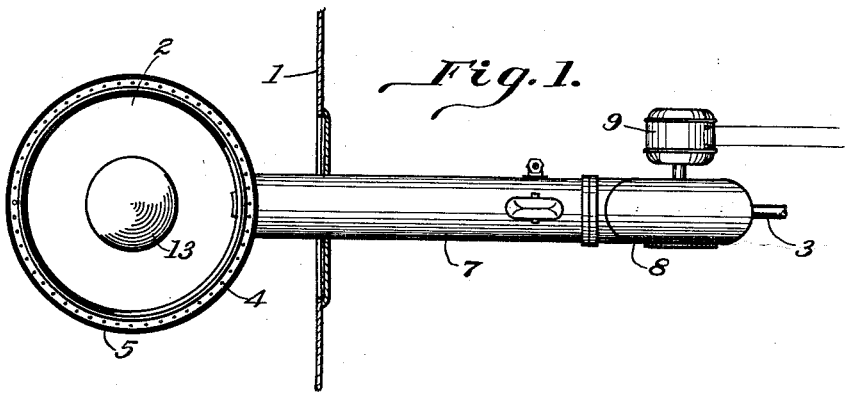
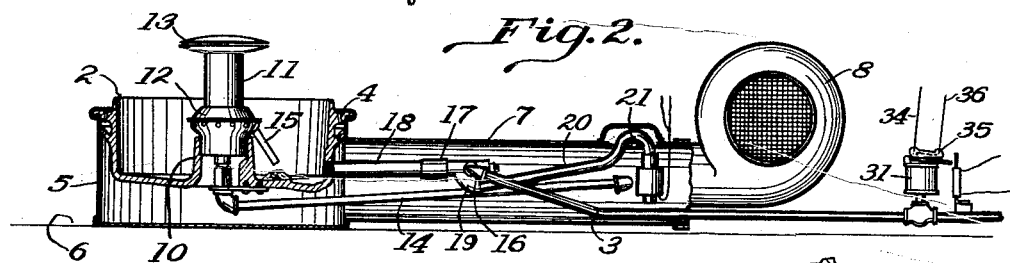
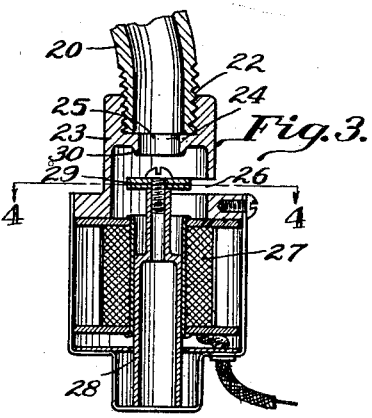
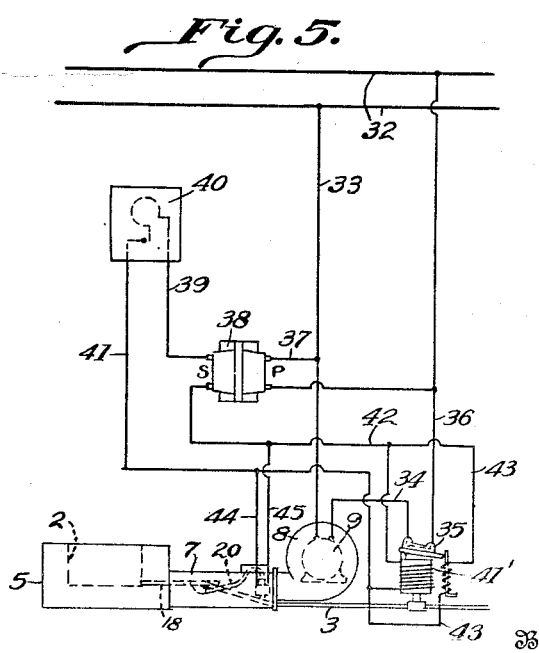
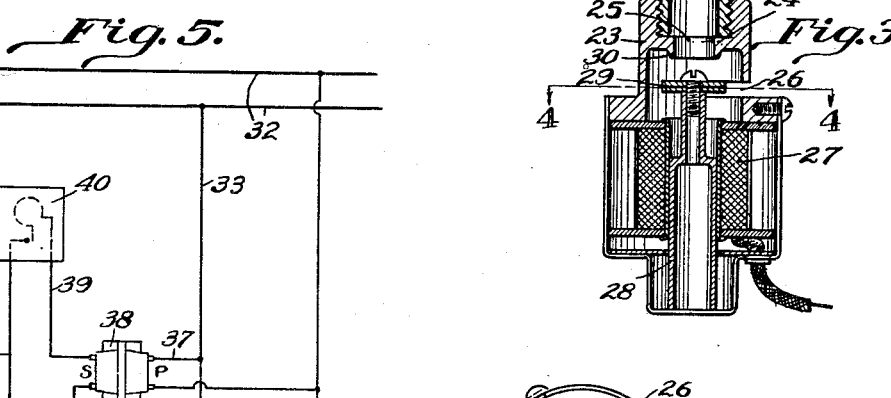
Inventor
A. J. Frame
By W. A. McDowell
Attorney Patented Apr. 12, 1932

1,853,345

UNITED STATES PATENT OFFICE

AUGUSTUS J. FRAME, OF COLUMBUS, OHIO, ASSIGNOR TO FRANKLIN OIL HEATING INC., OF COLUMBUS, OHIO, A CORPORATION OF OHIO

OIL BURNING APPARATUS

Application filed July 17, 1931. Serial No. 551,439.

This invention relates to improvements in oil burning apparatus, and has particular reference to automatic apparatus of the type employed in connection with the heating systems of residences and other buildings. In certain of its more specific aspects, the present invention constitutes an improvement on the construction disclosed and claimed in my earlier Patent No. 1,786,832 issued Dec. 30, 1930, wherein I appear as joint inventor with H. B. Donley and J. G. Gilmore.

In the aforesaid patent, there is set forth oil burning apparatus wherein provision is made for permitting of the positive introduction of an added body of air into an oil supply line leading to a combustion vessel to remove oil from said line and permit of its efficient combustion for a predetermined period after the arrest of the oil flow through said line by automatic valve means. In said former patent, however, the auxiliary air supply pipe, which is connected with the oil supply line leading to the combustion vessel, is so arranged that its air intake end is in constantly open communication with the main air duct, employed in delivering air to the combustion vessel. As a result of this construction, air has been forced into the oil supply line during the normal operation of the apparatus, interfering with the regulated oil flow and producing other undesirable conditions.

To improve upon this situation, the present invention has for its primary object to provide the air intake end of the auxiliary air line with an automatic valve which functions, during passage of oil through the oil supply line to remain in a closed position, preventing the passage of air through the auxiliary air pipe, whereby upon the arresting of oil flow through the oil supply line, the said valve functions to admit of the opening of the air intake end of the air pipe, whereby to provide, for a desired period of time, air flow through said pipe to expel oil from the discharge end of the oil supply line and to admit of the combustion thereof in such a manner as to prevent the clogging or choking of the oil supply line with carbon deposit.

With these and other objects in view, which will appear as the description proceeds, the invention consists in the novel features of construction, combination of elements and arrangements of parts hereinafter fully described and pointed out in the appended claims.

In the accompanying drawings:

Fig. 1 is a top plan view of oil burning apparatus embodying the present invention;

Fig. 2 is a view in side elevation and partly in vertical section of said apparatus;

Fig. 3 is a detail vertical sectional view taken through the control valve provided in connection with the inlet end of the auxiliary air supply line;

Fig. 4 is a horizontal section taken through said valve on the line 4—4 of Fig. 3;

Fig. 5 is a diagrammatic view disclosing the electric circuits employed in the control of the apparatus and said valve.

Referring more particularly to the drawings, the numeral 1 designates the wall of an ordinary furnace. Within the combustion chamber of such a furnace there is mounted an open topped combustion vessel 2, preferably in the form of a unitary casting. An oil level is maintained in the bottom of the vessel 2 during the operation of the burner apparatus and in accomplishing this result, use is made of an oil supply line 3. The upper portion of the vessel 2 is provided with an external circular flange 4 provided at intervals with apertures. A sheet metal casing 5 engages with the flange 4 and rests upon a floor or base surface 6, supporting the vessel 2 above such surface. Connected with the casing 5 is a main air supply conduit or duct 7, which leads to an air fan or blower 8, which is driven by an electric motor 9.

The vessel 2 in this instance is formed with an axially positioned upstanding boss 10 in which is fitted the lower end of a central air distributor 11. This distributor is provided with vertically spaced heads 12 and 13 which are suitably apertured in order to direct air streams outwardly and transversely into and across the combustion vessel in order to combine with the oil vapors liberated from the film of oil contained in the bottom of the vessel to produce a combustible mixture. The air passes from the duct 7 beneath the vessel and upwardly through the boss 10 and the distributor 11 and is then discharged from the apertures formed in the heads 12 and 13. Also, the air is discharged upwardly through the apertures provided in the flange 4, substantially as described in my aforesaid patent.

A gas supply line 14 enters the conduit 7 from any suitable source of gas supply and passes beneath the vessel 2 and upwardly through the boss 10 and the distributor 11, the said line 14 terminating in a downwardly and angularly directed jet 15. By means of the jet 15, a small pilot flame may be continuously maintained within the combustion vessel to effect active combustion when oil is permitted to pass through the line 3 and to accumulate within said vessel.

The forward end of the oil supply line terminates in an elbow fitting 16 which enters a coupling 17, disposed within the conduit 7, and from the coupling 17, a pipe section 18 extends into the bottom of the vessel 2, the forward end of the section 18 being threaded and received within a correspondingly formed opening provided in the side wall of said vessel contiguous to the bottom of the latter. The coupling 17 is formed at its forward lower portion with an offset 19 into which is threaded the lower end of an auxiliary air supply pipe 20. This pipe extends angularly within the duct 7 and has its upper end terminated in a gooseneck 21 which is disposed in a horizontal plane above the level of the liquid oil which may accumulate in the bottom of the combustion vessel 2. The neck 21 terminates in a downwardly extending portion which, as shown in Fig. 3, is exteriorly threaded as at 22 for the reception of the correspondingly threaded upper end of a valve casing 23. This casing includes a transversely extending web 24 in which is formed a normally open port 25, and the side wall of the casing 23 is slotted as at 26 so that the interior of the casing communicates with the interior of the duct 7, whereby air passing under pressure through said duct may be permitted to pass through the slotted portion 26 of the casing and thence through the normally open port 25 into the air supply pipe 20, and from this pipe into the oil supply line leading to the combustion vessel.

The casing 23, below the port 25, has securely mounted in connection therewith the field windings 27 of a solenoid. The core 28 of the solenoid has connected with the upper end thereof a valve disk 29, which is normally spaced from the port 25, especially when the field winding 27 is deenergized. However, when the field winding is energized, the core 28 is attracted to move the latter against gravity until the disk 29 engages with the valve seat 30 surrounding the lower portion of the port 25 whereby as long as the field winding remains energized, the disk 29 will be held in firm engagement with the seat 30 to arrest air flow into the air pipe 20.

This valve mechanism connected with the intake end of the air pipe is automatically operated at definite periods to assume positions of closure. Normally, the valve mechanism assumes a closed position when oil is being positively passed through the oil supply line to the combustion vessel and the valve is open when oil is not positively flowing through the oil supply line. In accomplishing this, the oil line 3 is provided with a solenoid valve 31 of the type disclosed in my prior Patent No. 1,781,453, dated November 11, 1930. In the operation of the valve 31, use is made of a circuit arrangement consisting of trunk leads 32. Connected with the incoming lead is a wire 33 which leads to one of the terminals of the motor 9. From the other terminal of the motor, a short lead 34 extends to one of the terminals of an oscillatory mercury switch 35 which is mounted on the solenoid valve 31, and a lead 36 extends from the other terminal of the switch 35 back to the return lead 32. When the solenoid of the valve 31 is energized, its core (not shown) is elevated providing for oil flow through the line 3 and at the same time the switch 35 is operated to a position closing the motor circuit, thereby starting the operation of the fan at the same time the oil flow takes place.

To energize the solenoid valve 31, the lead 33 is connected with a line 37 leading to one side of the primary side of a transformer 38 the other side of the primary being connected to lead 36. From the secondary side of the transformer, a lead 39 extends to the thermostat 40, which is placed in the area to be heated. When the temperature surrounding the switch 40 falls to a predetermined point, the switch 40 is closed, thereby permitting the flow of current from the lead 39 to a lead 41 which extends to the winding 41' of the solenoid valve. A return line 42 leads from the windings 41' and extends to the secondary side of the transformer. Hence when the switch 40 is closed, the solenoid 41' is excited in order to open said valve to permit of oil flow and to close the fan motor circuit.

To provide for the "over running" of the fan upon the deenergizing of the solenoid valve and the arresting of oil flow through the line 3, I employ the so-called "warping bar" construction set forth in my prior Patent 1,781,453, supra. This warping bar consists of a pair of thermo-responsive strips which are heated by means of a shunt circuit 43 connected with the leads 41 and 42. When the windings 41' are excited, the current passes through the circuit 43, heating the warping bar and causing the latter to engage with the mercury switch 35 to retain the latter in an elevated position of circuit closure independently of the core of the solenoid valve. Thus when the switch 40 opens and the windings 41' are deenergized, permitting the solenoid core and valve stem to fall to a position obstructing oil flow through the line 3, the thermostat warping bar by being heated maintains the mercury switch in its elevated position closing the fan circuit. Until the warping bar cools and straightens out, the fan circuit remains closed, thus providing for sustained air flow to the combustion vessel, even though the oil supply line is closed.

In this instance, the present invention provides going and return leads 44 and 45 which are connected respectively with the wires 41 and 42. The leads 44 and 45 are connected with the field windings 27 of the air supply valve, so that when the windings 41 of the oil controlling valve are excited, the windings 27 are similarly excited. Thus when the oil supply valve is opened, the air controlling valve is closed and vice versa. By this arrangement, it will be seen that when the burner apparatus is in active operation, and the oil is flowing through the line 3, the port 25 will be closed by the disk 29, preventing the entrance of air into the auxiliary air supply pipe 20. However, when the solenoid valve 31 is deenergized, the air controlling valve is likewise deenergized, since it is in the same circuit. This results in the opening of the air intake valve since the disk 29 and the core 28 drop by gravity when not under the influence of the field windings 27. The opening of the port 25 thus effected admits of the passage of air from the air duct 7 through the slot 26, the port 25 and into the pipe 20, passing from said pipe into the coupling 17 and thence by way of the pipe section 18 into the combustion vessel proper. In this manner, as long as the fan circuit remains closed, air under pressure passes into the oil supply line contiguous to the zone of entry of the latter into the combustion vessel, insuring a complete removal of oil from the pipe section 18 and likewise a thorough consumption or burning of the oil which remains to prevent any substantial formation of an obstructing carbon deposit. The construction described permits of sustained operation on the part of automatic oil burning apparatus for extended periods of time and overcomes to a marked degree clogging in the oil feed line which, in the past, has been a source of some difficulty or annoyance and has required manual attention from time to time to keep the oil line in an open condition.

What is claimed is:

1. In oil burning apparatus, a combustion vessel, an oil supply line communicating at one end with said combustion vessel, an air supply conduit leading to said vessel, a control valve for said oil supply line, an auxiliary pipe line communicating with said air supply conduit and entering said oil supply line at a position between said valve and said vessel, a motor, a fan driven by said motor for delivering air to said air supply conduit, a control valve for governing the flow of air into said auxiliary air line, and electrically controlled means for governing the opening and closing of said last named valve in accordance with the opening and closing of the oil flow control valve.

2. In oil burning apparatus, a combustion vessel, an oil supply line leading to said combustion vessel, an electrically operated control valve positioned in said oil supply line, an air supply conduit in communication at one end with said combustion vessel, an auxiliary pipe line communicating at one end with said air conduit and at its other end with said oil supply line at a position between said control valve and said combustion vessel, and an automatically operated valve carried in connection with the air intake end of said pipe line and operable in conjunction with the oil flow controlling valve to admit of the passage of air through said pipe line only when said oil control valve assumes a position arresting oil flow through said oil flow line.

3. In oil burning apparatus, a combustion device, means for supplying oil in regulated quantities to said combustion device, means for supplying air under pressure in regulated quantities to said combustion device, a pipe member in communication at one end with said air supply means and in communication at its other end with the oil supply means at a position contiguous to said burner device, and a valve for regulating air flow through said pipe member and operable to assume an open position permitting of such air flow when the positive advance of oil to said device through said oil supply means is arrested.

4. In oil burning apparatus, a combustion device, an oil feed line leading to said combustion device, an air supply conduit leading to said combustion device, a control valve located in said oil feed line and spaced from said combustion device, a pipe member communicating at one end with said air supply conduit and at its opposite end communicating with the oil feed line at a position between said combustion device and said control valve, a valve for governing air flow through said pipe member, and electrically operated means for simultaneously actuating the control valve of said oil feed line and the control valve of said pipe line.

5. In oil burning apparatus, a combustion device, an oil feed line leading to said combustion device, an air supply conduit extending to said combustion device, a motor driven fan for delivering air under pressure to the air supply conduit, a pipe member communicating at one end with said air supply conduit and at its opposite end with said oil feed line at a position contiguous to said combustion device, a valve for governing air flow through said pipe member, a valve for governing oil flow through the oil feed line, and electrically operated means for governing the operation of said control valves, whereby when the control valve in said oil feed line is open, the control valve in the pipe member is closed and vice versa.

6. In oil burning apparatus, a combustion device, an oil feed line leading to said combustion device, an air supply conduit extending to said combustion device, a motor driven fan for delivering air under pressure to the air supply conduit, a pipe member communicating at one end with said air supply conduit and at its opposite end with said oil feed line at a position contiguous to said combustion device, a valve for governing air flow through said pipe member, a valve for governing oil flow through the oil feed line, electrically operated means for governing the operation of said control valves, whereby when the control valve in said oil feed line is open, the control valve in the pipe member is closed and vice versa, and means operable for a predetermined period following the closure of the oil feed control valve to maintain said motor driven fan in active operation.

In testimony whereof I affix my signature.

AUGUSTUS J. FRAME.